United States Patent
Onica

(10) Patent No.: US 10,017,105 B2
(45) Date of Patent: Jul. 10, 2018

(54) VEHICLE CONTROL SYSTEM AND METHOD

(71) Applicant: Continental Automotive GmbH, Hannover (DE)

(72) Inventor: Dan Onica, Giroc (RO)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/098,881

(22) Filed: Apr. 14, 2016

(65) Prior Publication Data

US 2016/0325740 A1   Nov. 10, 2016

(30) Foreign Application Priority Data

May 8, 2015 (EP) .................................. 15465515

(51) Int. Cl.
*B62D 11/00* (2006.01)
*B60Q 1/04* (2006.01)
(Continued)

(52) U.S. Cl.
CPC ............... *B60Q 1/04* (2013.01); *B60K 35/00* (2013.01); *B60R 1/00* (2013.01); *B60T 7/22* (2013.01); *B60W 30/12* (2013.01); *B60W 30/143* (2013.01); *B60W 30/146* (2013.01); *B60W 30/16* (2013.01); *B60W 50/085* (2013.01); *B60W 50/14* (2013.01); *B62D 15/0265* (2013.01); *G01S 13/04* (2013.01); *G01S 15/04* (2013.01); *B60K 2350/1004* (2013.01); *B60R 2300/802* (2013.01); *B60W 2050/146* (2013.01); *B60W 2420/42* (2013.01); *B60W 2540/04* (2013.01)

(58) Field of Classification Search
CPC . B60K 35/00; B60R 1/00; B60T 7/22; B60W 30/12; B60W 30/143; B60W 30/146; B60W 30/16; B60W 50/085

USPC .......................................................... 701/41
See application file for complete search history.

(56) References Cited

U.S. PATENT DOCUMENTS

| 2010/0131642 | A1* | 5/2010 | Chalikouras | ....... | G06Q 30/0241 |
| | | | | | 709/224 |
| 2010/0253539 | A1* | 10/2010 | Seder | ..................... | G01S 13/723 |
| | | | | | 340/903 |
| 2012/0254779 | A1* | 10/2012 | Ollivierre | ............ | A61B 3/0041 |
| | | | | | 715/764 |

FOREIGN PATENT DOCUMENTS

| DE | 102011087459 | | 6/2013 |
| DE | 10-2013213039 | * | 1/2015 |
| DE | 102013213039 | | 1/2015 |

OTHER PUBLICATIONS

Extended European Search Report and Examination Report for European Patent Application No. 15465515.3, dated Nov. 9, 2015, 6 pages, Munich, Germany.

* cited by examiner

Primary Examiner — Muhammad Shafi
(74) Attorney, Agent, or Firm — W. F. Fasse

(57) ABSTRACT

A vehicle control system for a vehicle having a driver assistance system includes sensors configured to acquire data about surroundings of the vehicle, a user interface configured to display user information and acquire user input from a user, and a processing unit coupled to the sensors, the driver assistance system and the user interface. The processing unit is configured to produce and provide adapted parameters to the driver assistance system based on acquired user input about sensor data and/or actions performed by the driver assistance system. In a corresponding method, the parameters are adapted based on the acquired user input.

24 Claims, 3 Drawing Sheets

(51) Int. Cl.
*B60K 35/00* (2006.01)
*G01S 13/04* (2006.01)
*G01S 15/04* (2006.01)
*B60R 1/00* (2006.01)
*B60T 7/22* (2006.01)
*B62D 15/02* (2006.01)
*B60W 50/08* (2012.01)
*B60W 50/14* (2012.01)
*B60W 30/12* (2006.01)
*B60W 30/14* (2006.01)
*B60W 30/16* (2012.01)

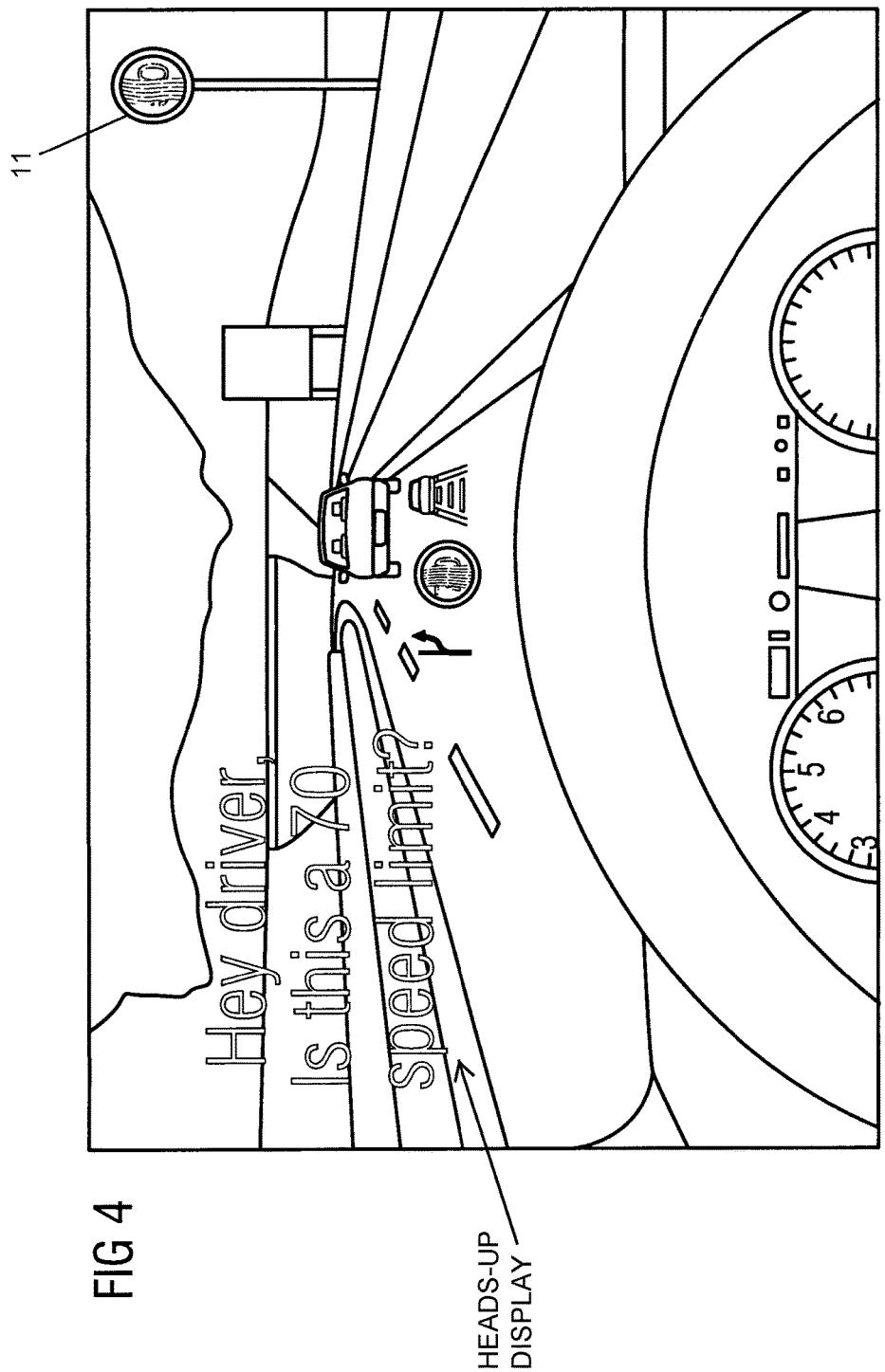

VEHICLE CONTROL SYSTEM AND METHOD

TECHNICAL FIELD

The present invention relates to a vehicle control system for a vehicle having a number of driver assistance systems. Furthermore, the invention relates to a corresponding method.

BACKGROUND

Although applicable to any system that uses control algorithms with parameters, the present invention will be described in combination with vehicles, and especially with parameters of driver assistance systems in vehicles.

In modern vehicles, a plurality of driver assistance systems can be provided to assist the driver in manoeuvring the vehicle.

For example, lane assistance systems can issue driver warnings if a vehicle is about to leave a driving lane without prior use of the turn lights or even provide a steering intervention to hold the vehicle in the driving lane.

Furthermore, cruise control systems can automatically detect vehicles in front of a vehicle and automatically accelerate and/or decelerate the vehicle to keep a predefined distance between the vehicles.

Further, driver assistance systems range from automatic parking functions to fully autonomous driving of a vehicle.

To provide such driver assistance systems, a detailed model of the vehicle's surroundings has to be established in the vehicle systems. This can, for example, be done by capturing video images of the vehicle's surroundings with mono or stereo video cameras and detecting objects in the video images.

Different algorithms are used for object detection, scene classification, and the like. Such algorithms are based on a plurality of parameters which can be individually tuned to match the desired behaviour.

One possibility is to use heuristics where possible scenarios are identified by problem analysis before the implementation of the algorithm. This solution uses heuristics to treat every single scenario and is thus limited to a finite number of scenarios.

An alternative is to use offline learning, where a model of the relevant scenarios is developed by problem analysis before the implementation of the algorithm. The algorithm is then trained offline, i.e. the parameters of the algorithm are tuned offline, to the most suited values. Using the models and a finite set of data the learning of the parameters is performed using ground truth information which is provided by labelling of the data. Such an algorithm can cope with an infinite number of scenarios. But the model parameters are frozen to the values learned before the release of the algorithm into the vehicle production.

SUMMARY

Accordingly, there is a need for a method and an apparatus which provide more versatile and flexible driver assistance systems.

This problem can be solved by one or more embodiments of the present invention in a vehicle control system and/or in a method as set forth herein.

Consequently, the present invention provides:

A vehicle control system for a vehicle having a number, i.e. one or more, of driver assistance systems, comprising a number, i.e. one or more, of sensors configured to acquire sensor data about surroundings of the vehicle, a user interface configured to display user information and acquire user input from a user, and a processing unit coupled to the sensors and the driver assistance systems and the user interface, wherein the processing unit is configured to provide one or more adapted parameters to the driver assistance systems based on acquired user input in relation to sensor data and/or one or more actions performed by the driver assistance systems.

Furthermore, the present invention provides:

A control method for a vehicle with a number of, i.e. one or more, driver assistance systems, comprising acquiring sensor data about surroundings of the vehicle, displaying user information about the sensor data and/or actions performed by the driver assistance systems, acquiring user input from a user about the sensor data and/or actions performed by the driver assistance systems, and adapting one or more parameters of the driver assistance systems based on the acquired user input.

The present invention is based on the conclusion that a driver of a vehicle is the best source of information when feedback about the actions of the driver assistance systems of the vehicle is needed.

Therefore, the present invention employs this knowledge and provides a vehicle control system with which the driver is questioned, e.g. about actions performed by the driver assistance systems, and the driver feedback is used to tune parameters of the driver assistance systems.

The questioning of the driver can be performed via a user interface which can display user information and receive user feedback. Furthermore, the processing unit adapts parameters for the driver assistance systems and transmits the adapted parameters to the driver assistance systems for future use.

The present invention provides a way of tuning the parameters of the algorithms in the driver assistance systems during the lifetime of the vehicle after the production of the vehicle.

By asking the driver for feedback and using the provided feedback to adapt the parameters of the driver assistance systems, the ground truth can be provided by the driver and the driver can influence the system performance to fit his/her needs.

The term "parameters" in this context refers to parameters of e.g. a model used by algorithms of driver assistance systems to model relevant scenarios. The parameters are hence tuned online and the new values are then used by driver assistance systems.

In a possible embodiment, the processing unit can be configured to present one or more questions about the sensor data and/or the actions performed by the driver assistance systems to the user via the user interface and to acquire user feedback about the sensor data and/or the actions performed by the driver assistance systems. By using a non-intrusive quiz to acquire feedback from the driver, interference with the driving can be minimized.

In a further possible embodiment, the vehicle control system can comprise a camera as a sensor configured to acquire image data about the surroundings of the vehicle, wherein the processing unit is configured to display possible objects detected in the image data to the user and to acquire feedback about the possible detected objects. The processing unit can be configured to adapt object detection parameters if the feedback indicates that the object was not correctly detected. Presenting the driver with a possible detected object from a camera image allows quick testing of an object detection algorithm. The object detection in one embodiment can be done by the driver assistance systems and information about the detected objects can be provided to the processing unit.

In a further possible embodiment, the actions of the driver assistance systems can comprise providing a steering intervention, and/or providing a braking or acceleration intervention, and/or controlling lights of the vehicle, especially head lights, and/or issuing a driver warning, especially a lane departure warning, and/or conducting a traffic sign detection, and/or conducting an object detection, especially a pedestrian detection. This allows the present invention to be used with different kinds of driver assistance systems.

In a further possible embodiment, the processing unit can be configured to present questions about the sensor data and/or the actions of the driver assistance systems which query whether an action performed by a driver assistance system was produced early or in time or late, and/or whether the intensity of an action performed by a driver assistance system was too high or correct or too low, and/or whether an object detected based on the sensor data was detected correctly. This allows adapting the query to the type of action performed by the driver assistance system. For example the processing unit can be configured to present questions about the reason(s) why e.g. an autonomous system was disabled by the driver or automatically was looped back to the driver. So the driver could directly "comment" on their perception of the (re)action of the autonomous driving of the vehicle.

In a further possible embodiment, the user interface can comprise a head-up display of the vehicle configured to display the user information. A head-up display presents information to a driver of a vehicle without the driver having to look away from the street.

In a further possible embodiment, the user interface can comprise a speech recognition device and/or a number of buttons and/or an image recognition device to acquire user input. This allows receiving user input from the driver in different ways, where the method can be chosen which poses the least distraction to the driver.

In a further possible embodiment, the processing unit can be configured to start interrogation of the user about the sensor data and/or the actions of the driver assistance systems if a user pushes a predefined button of the user interface and/or issues a predefined voice command and/or provides a predefined gesture. This allows questioning the driver after a function was performed by a driver assistance system if the driver indicates that he was not satisfied by the function.

In a further possible embodiment, the processing unit can be configured to adapt the parameters by respectively widening or narrowing a range indicated by a respective current parameter. Furthermore the processing unit can be configured to adapt the parameters by respectively increasing or decreasing a value of a respective current parameter. This allows flexibly adapting different parameters for different algorithms.

In a further possible embodiment, the sensors can be coupled to the driver assistance systems and the driver assistance systems can forward sensor data to the vehicle control system. This allows using all sensors in the vehicle with the vehicle control system of the present invention.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which:

FIG. 4 shows a schematic diagram of a vehicle where an object is presented to a driver.

In the figures like reference signs denote like elements unless stated otherwise.

DETAILED DESCRIPTION OF THE DRAWINGS

Figure 1:
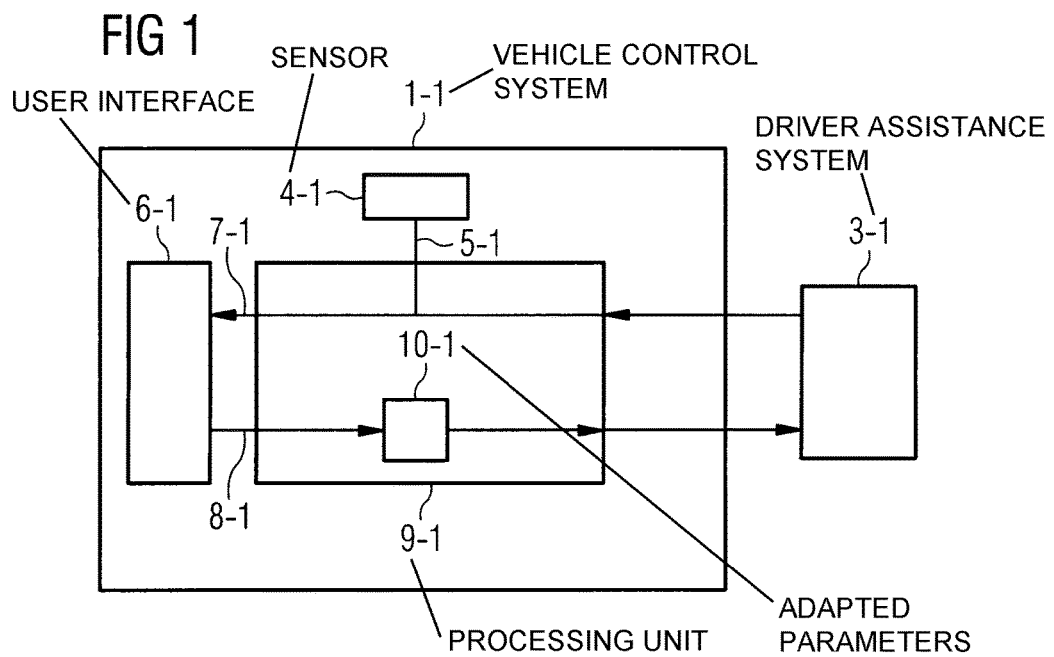
FIG. 1 shows a block diagram of an embodiment of a vehicle control system according to the present invention.

FIG. 1 shows a block diagram of an embodiment of a vehicle control system 1-1 according to the present invention.

The vehicle control system 1-1 is connected to a driver assistance system 3-1 which provides the vehicle control system 1-1 with information about actions performed by the driver assistance system 3-1.

The vehicle control system 1-1 comprises a sensor 4-1 which acquires data 5-1 about the surroundings of the vehicle 2 in which the driver assistance system 3-1 is installed. The sensor 4-1 can be any type of sensor 4-1, like e.g. a camera, a radar sensor, an ultrasonic sensor or the like. The sensor 4-1 can also comprise any combination of the listed single sensing elements or the like and can be arranged in the driver assistance system 3-1 or the like.

A processing unit 9-1 receives the sensor data 5-1 from the sensor 4-1 and the information about actions performed by the driver assistance system 3-1. The processing unit 9-1 can then provide information to the user about the sensor data 5-1 and/or the actions performed by the driver assistance system 3-1.

The processing unit 9-1 can e.g. display questions to the driver about sensor data 5-1 or an action performed by the driver assistance system 3-1. This can e.g. be done right after the action is performed by the driver assistance system 3-1. Possible actions of the driver assistance systems can be providing a steering intervention, providing a braking or acceleration intervention, controlling lights of the vehicle 2, especially head lights, issuing a driver warning, especially a lane departure warning, conducting a traffic sign detection, and conducting an object detection, especially a pedestrian detection.

For example the processing unit 9-1 can query whether an action performed by a driver assistance system 3-1 was produced early or in time or late, whether the intensity of an action performed by a driver assistance system 3-1 was too high or correct or too low.

The questions can refer to different driver assistance systems 3-1. Possible questions refer to but are not limited to:

A lane keeping or warning, e.g. questions can be asked like "Was the previous lane departure warning undesired?", "Was the previous steer intervention too abrupt?" or the like.

With reference to an electronic brake assistance e.g. questions can be asked like "Was the brake intervention issued later than expected?" or was the brake intervention issued stronger/lighter than expected?". Other questions can make reference to an intelligent headlight control or a traffic sign assist or pedestrian detection or the like. The questions can include "Was the previous setting of High Beam to Off desired?", "Was there a pedestrian on the sidewalk?", or the like.

The processing unit 9-1 can also query whether an object 11 (see FIG. 4) detected based on the sensor data 5-1 was detected correctly. For example a section of a camera image or an image of the possible detected object can be shown to the driver on a display and he can be asked if the displayed object is in fact the type of object that was detected. For example the driver can be asked "Is the sign displayed on the display an 80 speed limit?", where the display shows a cut from the image with a sign which was just passed and the sign recognition classified, maybe wrongly, as an 80 speed limit, or "Is the displayed shape a pedestrian?", where in the display a cut from an image is displayed where the algorithm assumed a pedestrian is located.

It is clear that this list is not comprehensive and only shows exemplary questions. Other questions can make reference to any parameter or function of any electronic system in a vehicle.

The processing unit 9-1 then analyses the user input 8-1 and generates adapted parameters 10-1 for the driver assistance system 3-1 if the driver was not satisfied with a function performed by the driver assistance system 3-1 or if an object was not correctly detected.

The processing unit 9-1 can e.g. adapt the parameters 10-1 by widening and/or narrowing a range indicated by a respective parameter 10-1. In addition or as an alternative the processing unit 9-1 can e.g. adapt the parameters 10-1 by increasing and/or decreasing a value of a respective parameter 10-1.

Another possible adaption of the parameters would be a reset functionality that could be used when the resulted parameters are not fitting the driver's expectation and which would reset the parameter values to predefined values.

Figure 2:
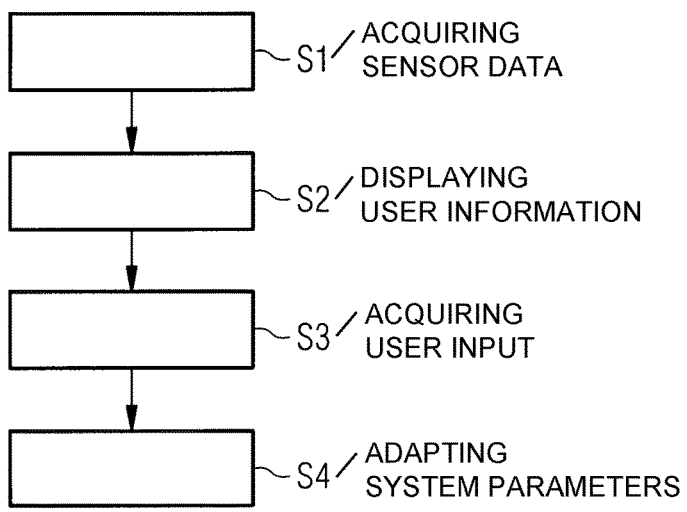
FIG. 2 shows a flow diagram of an embodiment of a control method according to the present invention.

FIG. 2 shows a flow diagram of an embodiment of a control method according to the present invention for a vehicle 2 comprising a number of driver assistance systems 3-1; 3-2.

The method comprises acquiring, S1, sensor data 5-1; 5-2 about surroundings of the vehicle 2. After acquiring the sensor data 5-1; 5-2 user information 7-1 about the sensor data 5-1; 5-2 or about actions performed by the driver assistance systems 3-1; 3-2 e.g. based on the sensor data 5-1; 5-2 is displayed, S2 to the user. The user can react to the displayed user information 7-1 and the corresponding user input 8-1 is acquired, S3, from the user. Based on the user input 8-1 parameters 10-1; 10-2 of the driver assistance systems 3-1; 3-2 are adapted, S4. The adapted parameters 10-1; 10-2 can then be used by the driver assistance systems 3-1; 3-2 to control the vehicle.

In one embodiment displaying, S2, user information 7-1 comprises presenting questions about the sensor data 5-1; 5-2 and/or the actions performed by the driver assistance systems 3-1; 3-2 to the user.

The actions of the driver assistance systems 3-1; 3-2 can in one embodiment comprise providing a steering intervention, providing a braking or acceleration intervention, controlling lights of the vehicle 2, especially head lights, issuing a driver warning, especially a lane departure warning, conducting a traffic sign detection, conducting an object 11 detection, especially a pedestrian detection.

Furthermore, displaying, S2, user information 7-1 can comprise presenting questions about the sensor data 5-1; 5-2 and/or the actions of the driver assistance systems 3-1; 3-2 which query whether an action performed by a driver assistance system 3-1; 3-2 was produced early or in time or late, whether the intensity of an action performed by a driver assistance system 3-1; 3-2 was too high or correct or too low, and whether an object 11 detected based on the sensor data 5-1; 5-2 was detected correctly. The above lists are only exemplary and are not exhaustive.

Furthermore, in one embodiment acquiring, S3, sensor data 5-1; 5-2 about surroundings of the vehicle 2 comprises acquiring image data 5-1; 5-2 about the surroundings of the vehicle 2. Furthermore, radar data, ultrasonic data or the like can also be acquired.

If image data 5-1; 5-2 is acquired displaying, S2, user information 7-1, 7-2 can comprise displaying, S2, possible objects 11 detected in the image data 5-1; 5-2 to the user, and acquiring, S4, user input 8-1; 8-2 can comprise acquiring feedback about the possible detected objects 11.

Interrogation of the user about the sensor data 5-1; 5-2 and/or the actions of the driver assistance systems 3-1; 3-2 can e.g. begin if a user pushes a predefined button of a user interface 6-1-6-4 and/or issues a predefined voice command and/or provides a predefined gesture. This allows the user to inform the vehicle control system 1-1; 1-2 that he was not satisfied with an action of a driver assistance system 3-1; 3-2 and such to trigger the learning process.

If a parameter has to be adapted adapting the parameters 10-1; 10-2 can comprise widening and/or narrowing a range indicated by a respective parameter 10-1; 10-2 or increasing and/or decreasing a value of a respective parameter 10-1; 10-2.

Figure 3:
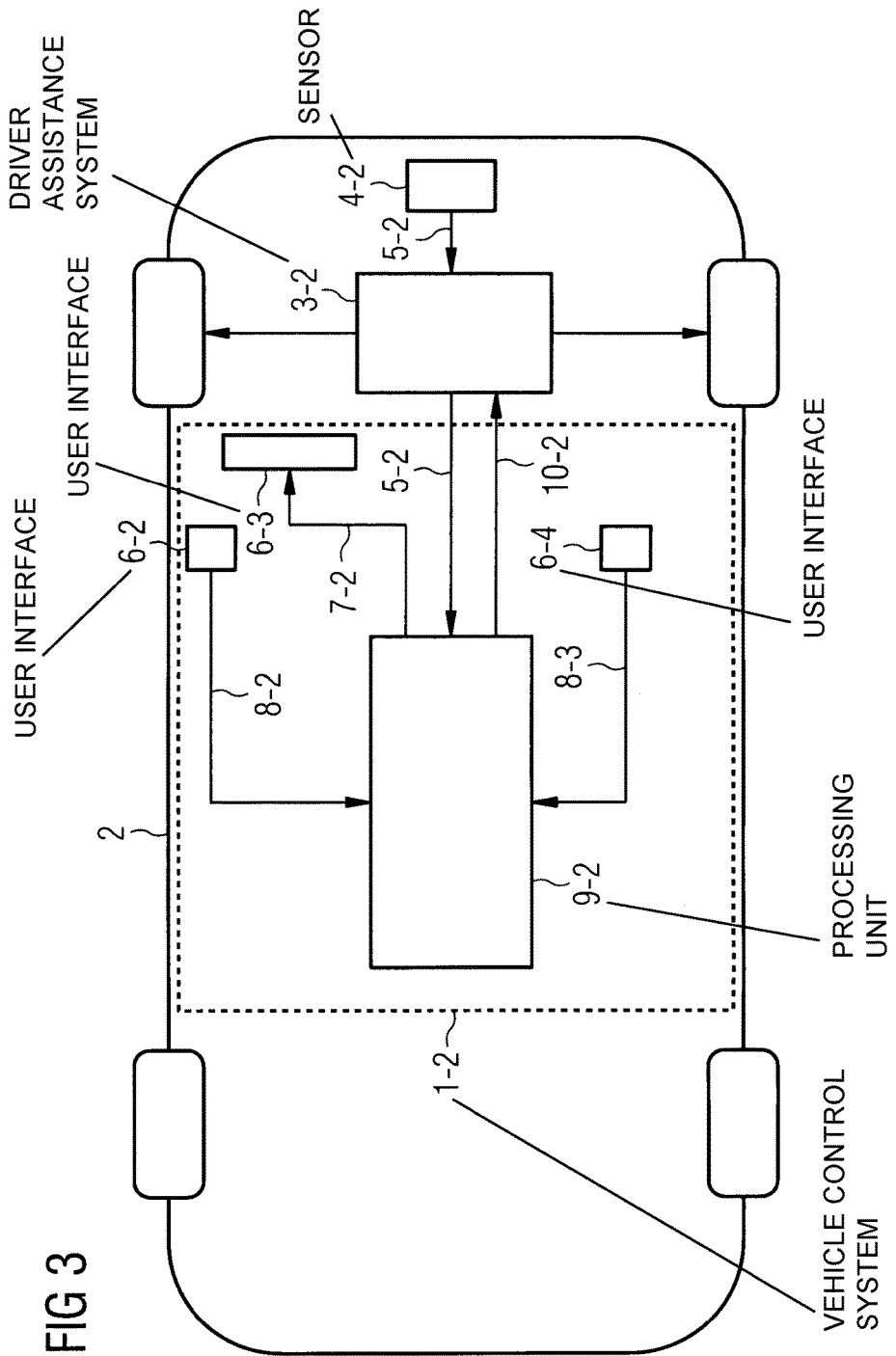
FIG. 3 shows a block diagram of another embodiment of a vehicle control system according to the present invention.

FIG. 3 shows a block diagram of another embodiment of a vehicle control system 1-2 according to the present invention which is installed in a vehicle 2 with a driver assistance system 3-2.

The driver assistance system 3-2 of FIG. 3. is just exemplarily depicted as connected to the wheels of the vehicle 2, where the driver assistance system 3-2 can accelerate and decelerate the vehicle 2. It is clear that other driver assistance systems 3-2 can also be used with the vehicle control system 1-2.

In FIG. 3 the sensor 4-2 is connected to the driver assistance system 3-2 and is only indirectly connected to the vehicle control system 1-2. The sensor 4-2 can e.g. be a camera 4-2 or a radar sensor 4-2 of the driver assistance system 3-2.

The vehicle control system 1-2, and especially the processing unit 9-2, receives the sensor data 5-2 from the driver assistance system 3-2. Furthermore, the processing unit 9-2 is coupled to one or more push buttons 6-2, a heads up display 6-3 of the vehicle 2 and a microphone 6-3. The push buttons 6-2, the heads up display 6-3, and the microphone 6-3 constitute the user interface of the vehicle control system 1-2.

The processing unit 9-2 can e.g. present in the heads up display 6-3 objects which were detected by the camera 4-2 and were classified by an object classification algorithm of the driver assistance system 3-2. The driver of the vehicle 2 can then confirm e.g. via the push buttons 6-2 that the object was correctly detected or inform the processing unit 9-2 that the object was not correctly classified. The driver can also speak into the microphone 6-4 and the response can be analysed via a voice analysis algorithm in the processing unit 9-2. Alternatively or in addition (not shown in FIG. 3) the response of the driver can be detected by filming the driver and analysing his gestures.

If the object was not correctly classified the processing unit 9-2 can adapt parameters 10-2 of the driver assistance system 3-2, especially of the object classification algorithm, and provide the adapted parameters 10-2 to the driver assistance system 3-2.

The processing unit 9-2 can also present further questions about actions performed by the driver assistance system 3-2 to the driver, see explanation of FIG. 1.

Furthermore, the processing unit 9-2 can not only present the user information 7-2 on the heads up display 6-3. For example the processing unit 9-2 can present the user information 7-2 as audio explanation over an audio system of the vehicle 2 or on other displays of the vehicle 2.

As already explained in conjunction with FIG. 1 the querying of the driver can be initiated by the processing unit 9-2 right after a function of a driver assistance system 3-2 has been executed.

In addition or as an alternative the driver can also initiate the querying by pushing a respective button, issuing a respective voice command or providing a respective gesture.

In one embodiment the processing unit 9-2 is configured to adapt parameters 10-2 automatically if a driver interrupts a function of a driver assistance system 3-2 with a vehicle control action, like e.g. accelerating or braking the vehicle 2 or steering the vehicle 2.

If e.g. a cruise control system drives the vehicle 2 behind a vehicle with a defined gap between the vehicles and the driver accelerates the vehicle 2 to narrow the gap, the processing unit 9-2 can automatically set the parameter for the size of the gap to a smaller value.

The vehicle control system 1-2 can e.g. be a dedicated control unit 9-2 in the vehicle 2 which is connected to further systems of the vehicle 2 via a vehicle bus, like e.g. a CANBus, a FlexRay-Bus, a MOST-Bus, an Ethernet-Bus or the like.

Alternatively the vehicle control system 1-2 can at least in part be embodied as a computer program which can be executed in a control unit of the vehicle 2. In such an embodiment the computer program can e.g. be executed in a driver assistance system's processor together with the other software components of the driver assistance system 3-2.

FIG. 4 shows a schematic diagram of a vehicle where an object 11 is presented to a driver. In FIG. 4 a first person view from the driver seat is shown, where a heads up display is installed in the vehicle to display information on the wind shield of the vehicle.

Right of the street on which the vehicle is driving a 70 km/h (kilometers per hour) sign is visible. This sign has been detected by a camera of a driver assistance system.

To confirm this detection the vehicle control system (not explicitly shown) displays the section of the captured image in which the sign is in the head-up display together with the question "Hey driver, is this a 70 speed limit?".

The driver can then input his answer either via a touch screen, push buttons, voice commands, gestures or the like.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 1-1; 1-2 vehicle control system
2 vehicle
3-1; 3-2 driver assistance system
4-1; 4-2 sensor
5-1; 5-2 data
6-1-6-4 user interface
7-1; 7-2 user information
8-1-8-3 user input
9-1; 9-2 processing unit
10-1; 10-2 adapted parameters
11 object

The invention claimed is:

1. An apparatus including a vehicle control system and a driver assistance system for a vehicle, the control system comprising:
   a sensor configured to acquire sensor data regarding surroundings of the vehicle;
   a user interface configured to display user information and to acquire a user input from a user; and
   a processing unit coupled directly or indirectly to the sensor and the user interface, wherein the processing unit is configured to obtain object information about an object in the surroundings that was detected and recognized from the sensor data, to produce the user information comprising a query to the user about whether or not the object was correctly detected or recognized, to produce an adapted parameter by changing a current parameter in response to and dependent on the acquired user input comprising a user reply to the query, and to provide the adapted parameter to the driver assistance system to perform a driver assistance function;

wherein the changing of the current parameter comprises at least one of to increase or decrease a value of the current parameter, to reset the value of the current parameter to a predefined value, and/or to widen or narrow a range indicated by the current parameter;

wherein the driver assistance system is configured to automatically control a vehicle operation by performing the driver assistance function using and dependent on the adapted parameter; and wherein the driver assistance function comprises at least one of:
an automatic control of a steering of the vehicle,
an automatic control of a braking of the vehicle,
an automatic control of an acceleration of the vehicle,
an automatic control of lights of the vehicle,
an automatic traffic sign detection, and/or
an automatic pedestrian detection.

2. The apparatus according to claim 1, wherein the sensor is connected directly to the processor unit.

3. The apparatus according to claim 1, wherein the driver assistance system is configured to detect and recognize the object from the sensor data and to produce the object information, and wherein the processing unit is connected to the driver assistance system and is configured to obtain the object information from the driver assistance system.

4. The apparatus according to claim 3, wherein the sensor is connected to the driver assistance system, and through the driver assistance system is connected indirectly to the processing unit.

5. The apparatus according to claim 1, wherein the driver assistance system is configured to detect and recognize the object from the sensor data using the current parameter, and wherein the processing unit is configured to receive the current parameter from the driver assistance system.

6. The apparatus according to claim 1, wherein the driver assistance function comprises the traffic sign detection and/or the pedestrian detection, and an automatic control of a driving operation of the vehicle in response thereto.

7. The apparatus according to claim 1, wherein the driver assistance function comprises the automatic control of the steering, the automatic control of the braking and/or the automatic control of the acceleration of the vehicle.

8. The apparatus according to claim 1, wherein the processing unit is further configured to present the user information further comprising a question about an action performed by the driver assistance system to the user via the user interface and to acquire from the user interface the user input further comprising a user feedback in relation to the action performed by the driver assistance system.

9. The apparatus according to claim 8, wherein the processing unit is configured to present the question about the action performed by the driver assistance system as a question about at least one of:
whether the action performed by the driver assistance system was performed early or in time or late; and/or
whether an intensity of the action performed by the driver assistance system was too high or correct or too low.

10. The apparatus according to claim 1, wherein:
the sensor comprises a camera configured to acquire the sensor data as image data regarding the surroundings of the vehicle,
the processing unit is configured to display the user information further comprising information about the object that was detected in the image data,
the current parameter is an object detection parameter, and
the processing unit is configured to produce the adapted parameter by changing the object detection parameter when the user reply indicates that the object was not correctly detected or recognized.

11. The apparatus according to claim 1, wherein:
the user interface comprises a head-up display of the vehicle configured to display the user information; and/or
the user interface comprises a speech recognition device and/or a number of buttons and/or an image recognition device to acquire the user input.

12. The apparatus according to claim 1, wherein the processing unit is configured to produce the query when the user pushes a predefined button of the user interface and/or issues a predefined voice command and/or provides a predefined gesture, which the user interface is configured to detect.

13. The apparatus according to claim 1, wherein the changing of the current parameter comprises to widen or narrow the range indicated by the current parameter.

14. The apparatus according to claim 1, wherein the changing of the current parameter comprises the resetting of the value of the current parameter to the predefined value.

15. A method of controlling a vehicle having a driver assistance system, the method comprising:
a sensor acquiring sensor data regarding surroundings of the vehicle;
a processing unit obtaining object information about an object in the surroundings that was detected and recognized from the sensor data, and producing user information comprising a query to a user about whether or not the object was correctly detected or recognized;
a user interface displaying the user information to the user, and acquiring from the user a user input comprising a user reply to the query;
the processing unit producing an adapted parameter by changing a current parameter in response to and dependent on the acquired user input, and providing the adapted parameter to the driver assistance system for performing a driver assistance function, wherein the changing of the current parameter comprises at least one of increasing or decreasing a value of the current parameter, resetting the value of the current parameter to a predefined value, and/or widening or narrowing a range indicated by the current parameter; and
the driver assistance system, using and dependent on the adapted parameter, automatically controlling a vehicle operation by performing the driver assistance function comprising at least one of:
a steering control of the vehicle,
a braking control of the vehicle,
an acceleration control of the vehicle,
a light control of the vehicle,
a traffic sign detection, and/or
a pedestrian detection.

16. The method according to claim 15,
further comprising the driver assistance system detecting and recognizing the object from the sensor data, and producing the object information; and
the processing unit obtaining the object information from the driver assistance system.

17. The method according to claim 16,
wherein the driver assistance system performs the detecting and recognizing of the object from the sensor data using the current parameter, and comprising the processing unit receiving the current parameter from the driver assistance system.

18. The method according to claim 15, wherein the user information further comprises a question about an action performed by the driver assistance system.

19. The method according to claim 18, wherein the question about the action performed by the driver assistance system is a question about at least one of:
whether the action performed by the driver assistance system was performed early or in time or late; and/or
whether an intensity of the action performed by the driver assistance system was too high or correct or too low.

20. The method according to claim 15, wherein the producing and the displaying of the user information comprising the query begins when the user pushes a predefined button of the user interface and/or issues a predefined voice command and/or provides a predefined gesture, which the user interface detects.

21. The method according to claim 15, wherein the changing of the current parameter comprises the widening or the narrowing of the range indicated by the current parameter.

22. The method according to claim 15, wherein the changing of the current parameter comprises the resetting of the value of the current parameter to the predefined value.

23. The method according to claim 15, wherein the driver assistance function comprises performing the traffic sign detection and/or the pedestrian detection, and controlling a driving operation of the vehicle in response thereto.

24. The method according to claim 15, wherein the driver assistance function comprises performing the steering control, the braking control and/or the acceleration control of the vehicle.

* * * * *